June 24, 1958 S. W. SMITH 2,840,324
AIRFOIL HINGE JET NOZZLE DEVICE
Filed May 17, 1956
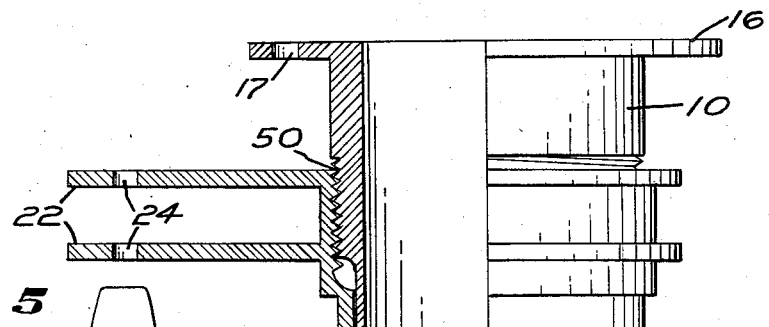
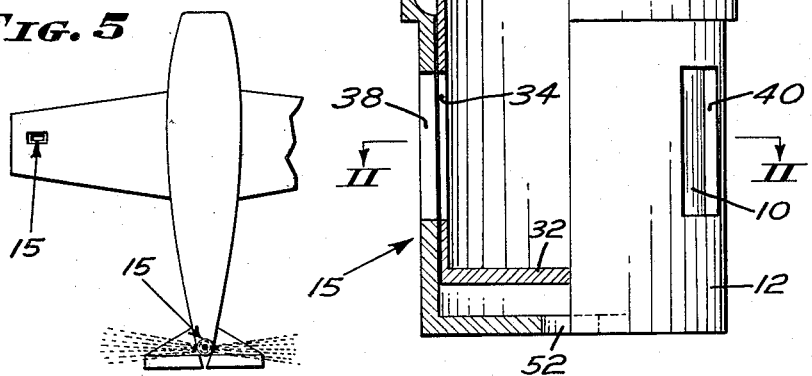
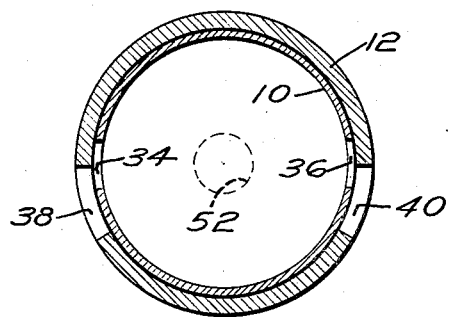
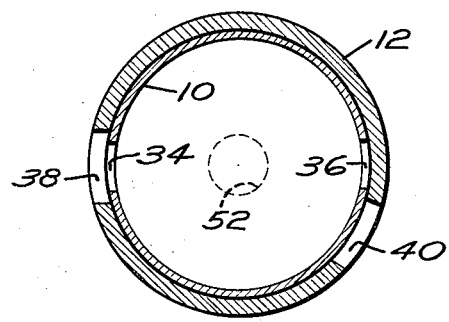
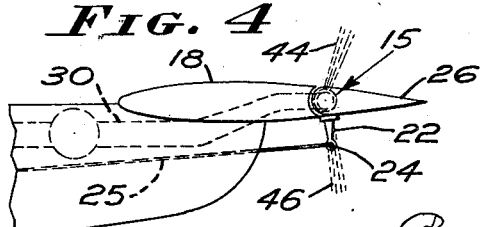
INVENTOR:
STANLEY W. SMITH
BY:
Beau, Brooke, Buckley & Beau,
ATTORNEYS.

United States Patent Office 2,840,324
Patented June 24, 1958

2,840,324

AIRFOIL HINGE JET NOZZLE DEVICE

Stanley W. Smith, Lyndonville, N. Y., assignor to Bell Aircraft Corporation, Wheatfield, N. Y.

Application May 17, 1956, Serial No. 585,561

3 Claims. (Cl. 244—52)

This invention relates to airplane flight control means, and more particularly to an improved type jet reaction nozzle for use in an airplane control system such as disclosed in W. W. Williams, U. S. Patent No. 2,451,008, and likewise such as is disclosed in a companion patent application titled "Aircraft Flight Control Means" being filed concurrently herewith by Gordon K. Hood, Jr., and James A. O'Malley.

Whereas, the aforesaid patent and application disclose novel aircraft control systems employing as conjunctive components thereof reaction jet nozzle devices, the present invention relates to an improved design for a nozzle device in such usages.

In the accompanying drawing:

Fig. 1 is a view, partly in side elevation, and partly in section, of a nozzle device of the present invention;

Fig. 2 is a section taken along line II—II thereof;

Fig. 3 is a view similar to Fig. 2, but showing the nozzle adjusting parts in a different condition of adjustment;

Fig. 4 is a schematic side elevational view showing by way of one example application of the invention to an airplane elevator control arrangement; and Fig. 5 is a fragmentary plan view of an airplane embodying the invention for control of the aircraft about other axes.

As shown in the drawing at Figs. 1–3, the device of the invention is provided in the form of a structurally simple two-piece combination rotation bearing and throttling nozzle comprising a generally cylindrical inner sleeve 10 and a generally cylindrical outer sleeve 12. The composite bearing-nozzle device is designated generally at 15. As shown in detail in Figs. 1–3, the inner sleeve 10 is open at one end and is provided with a mounting flange 16 for bolted connection as indicated at 17 to any stationary fixed structure of the aircraft such as a fixed stabilizer as indicated at 18 (Fig. 4). The outer sleeve portion 12 of the device is provided with crank or horn portions 22 extending radially therefrom for pivotal connection as indicated at 24 with the conventional pilot-controlled push-pull rod or the like as indicated at 25 (Fig. 4). The outer casing portion of the sleeve member 12 is fixedly gripped within any suitable bracket or clamp device extending from the associated movable control airfoil, which in Fig. 4 is shown to comprise an elevator 26. It is to be understood however that the invention is applicable with equal facility to a rudder or aileron type of control action; or independently of any movable airfoil, such as shown in Fig. 5.

The outer surface of the inner sleeve 10 is dimensioned so as to be freely rotatable within the inner bore of the outer sleeve 12, whereby the two sleeve members are adapted to function as a rotation bearing device for hinging of the control airfoil 26 upon the fixed aircraft structure. The flange portion 16 of the inner sleeve is also arranged to be coupled to a pressured gas supply duct 30 (Fig. 4) for conveyance to the interior of sleeve 10 of a constant supply of air or gas under pressure. At its inner end the sleeve 10 is closed by means of an end wall 32 (Fig. 1), and the sleeve 10 is provided with gas outlet ports 34—36 at generally diametrically opposite positions in the side wall construction thereof (Figs. 2, 3). The outer sleeve 12 is also formed with a pair of gas outlet orifices 38—40, and the orifices are so dimensioned and arranged that when the flight control airfoil 26 is in its neutral trailing position behind the stabilizer 18, the nozzle orifice openings are directed upwardly and downwardly from the nozzle device 15 and are both open to approximately equal degrees (Fig. 3) whereby reaction jet streams of equal force are discharged from the nozzle device 15 in opposite vertical directions as indicated at 44—46.

However, upon deflection of the control airfoil 26, as in response to pilot manipulations of the push-pull rod 25, the nozzle orifices will be thereby relatively adjusted differentially so that a larger proportion of the compressed air discharge will issue from either the upwardly or downwardly directed orifice as the case may be, to provide an unbalanced reaction force consistent with the control command displacement of the push-pull member 25. For example, if the pilot manipulates his control device so as to displace the push-pull member 25 forwardly or to the left as viewed in Fig. 4, the aerodynamic airfoil 26 will thereupon be deflected downwardly so as to provide an aerodynamic reaction force tending to lift the tail of the airplane upwardly. Concurrently with such deflection of the control flap 26, the throttle device 15 will be so adjusted that the upwardly directed orifice thereof will be closed totally or at least to some degree, while the downwardly directed orifice will be more widely opened, whereby the differential jet reaction forces developed by the nozzle device 15 will supplement the aerodynamic reaction forces developed by the deflected control flap 26. Thus, a single control manipulation on the part of the pilot will call into play coincident aerodynamic and jet reaction forces tending to rotate the airplane about the flight maneuvering axis such as is normally controlled only by deflection of the control flap 26.

As indicated at 50 (Fig. 1), the inner and outer sleeve devices 10—12 are preferably interconnected by means of a screw-thread connection device. This arrangement permits the inner and outer sleeves to rotate freely relative to one another incidental to control adjustments as hereinabove described, while at the same time the threaded connection 50 provides convenient means for fixing the movable flap 26 against longitudinal displacements and unintended disconnection of the bearing-throttle device. Also, the screwthread connection 50 serves the added function of a pressure sealing means, without resort to use of the usual type pressure sealing packing devices or the like. Whereas, the inner end of the inner cylinder 10 is closed as indicated at 32, in event some pressured gas escapes between the relatively rotating sleeve walls and enters the space below the inner sleeve end wall 32, a vent aperture as indicated at 52 is provided in the outer end of the outer cylinder 12, to avoid gas pressure accumulations therein such as might tend to relatively displace the two sleeve members.

Whereas, in the drawing in Fig. 4, the invention is illustrated as being employed in conjunction with an elevator type airplane control system, it will of course be appreciated that the nozzle of the invention may be employed with equal facility in conjunction with any other movable control surface, such as a rudder, ailerons, or the like. Or, as shown in Fig. 5, the device may be mounted on any suitable stationary structure of the airplane and pilot-adjusted by connections to the horns 22 to provide the desired airplane control reaction forces. In event the ports of the nozzle will be so arranged as to discharge pressured gas to develop jet reaction forces in directions laterally of the throttle device coincident with angular adjustments thereof incident to angular rotation of the control horn 22, which in some cases will be automatic incidental to adjustments of the aerodynamic control surface such as may be mounted upon the nozzle device. The arrangement of the ports of the nozzle device so as to discharge equally upwardly and downwardly in one condition of adjustment and for variable unbalanced laterally discharge incidental to other adjustments such as upon deflection of the flap away from its neutral position, enables the gas pressure system to at all times accommodate a constant flow of pressurized gas. This arrangement is particularly useful in the case where the compressed gas is supplied as from a constant output air compressor driven for example by the airplane engine. In such event it is preferred to permit the compressor to operate at optimum speed and output under all conditions; and the nozzle of the present invention automatically adjusts itself to provide the desired differential jet reaction control forces, while at all times accommodating flow of compressed air or gas at uniformly optimum rate.

It will of course be appreciated that although only one form of the invention has been shown and described in detail, it will be apparent to those skilled in the art that the invention is not so limited but that various changes may be made therein without departing from the spirit of the invention or the scope of the appended claims.

What is claimed is:

1. A jet reaction nozzle device comprising a pair of generally cylindrical telescopically and rotationally related members comprising an inner and outer member, said inner member having one end thereof open and provided with connection means for fixed attachment to a stationary portion of an airplane structure and for fluid-pressure sealed connection with a source of pressured gas to be supplied to the interior of said inner member, said outer member being adapted for attachment to a movable control component of said airplane structure and having a control crank arm extending radially therefrom, said cylindrical members having cooperating screwthreaded surface portions thereof interengaged to resist end thrust forces tending to relatively displace said members, said members having generally diametrically positioned ports through the cylindrical walls thereof adapted for relative registry upon rotation of said members relative to one another, the inner end of said inner member being closed to prevent escape of pressured gas therefrom except through said ports.

2. A combination hinge and jet reaction nozzle device comprising a pair of generally cylindrical telescopically and rotationally related members comprising an inner and an outer member, said inner member having one end thereof open and provided with connection means for fixed attachment to a stationary portion of an airplane structure and for fluid-pressure sealed connection with a source of pressured gas to be supplied to the interior of said inner member, said outer member being adapted for fixed attachment to a movable aerodynamic control airfoil component of said airplane structure and having a control crank arm extending radially therefrom, said cylindrical members comprising a rotation bearing device and having cooperating screwthreaded surface portions thereof interengaged to resist end thrust forces tending to relatively displace said members, said members having generally diametrically positioned ports through the cylindrical walls thereof adapted for relative registry upon rotation of said members longitudinally relative to one another, the inner end of said inner member being closed to prevent escape of pressurized gas therefrom except through said ports.

3. A combination hinge and jet reaction nozzle device comprising a pair of rotationally related members comprising an inner and an outer member, said inner member provided with connection means for fixed attachment to a stationary portion of an airplane structure and having an inner chamber portion adapted for fluid pressure sealed connection with a source of pressurized gas to be supplied to the interior of said inner member, said outer member being arranged for fixed attachment to a movable aerodynamic control airfoil component of said airplane, control means extending radially from said outer member, said members cooperating to comprise a rotation bearing device and having cooperating screwthreaded surface portions thereof interengaged to resist end thrust forces tending to relatively displace said members, said members having ports through the walls thereof adapted for alternate closing and opening upon rotation of said members relative to one another.

References Cited in the file of this patent
UNITED STATES PATENTS

| | | |
|---|---|---|
| 1,163,451 | Polmann | Dec. 7, 1915 |
| 2,488,008 | Ellwanger et al. | Nov. 15, 1949 |
| 2,648,350 | Hagen | Aug. 11, 1953 |